US009702228B2

United States Patent
Xu et al.

(10) Patent No.: US 9,702,228 B2
(45) Date of Patent: Jul. 11, 2017

(54) POROUS STRUCTURE FOR DOWNHOLE FLUID CONTROL APPLICATIONS AND METHOD OF MANUFACTURE

(71) Applicants: Zhiyue Xu, Cypress, TX (US); Steve M. Winnon, Conroe, TX (US)

(72) Inventors: Zhiyue Xu, Cypress, TX (US); Steve M. Winnon, Conroe, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 398 days.

(21) Appl. No.: 14/476,793

(22) Filed: Sep. 4, 2014

(65) Prior Publication Data

US 2016/0067826 A1  Mar. 10, 2016

(51) Int. Cl.
| | |
|---|---|
| *E21B 43/08* | (2006.01) |
| *B22F 3/11* | (2006.01) |
| *B23K 103/08* | (2006.01) |
| *B23K 103/10* | (2006.01) |
| *B23K 103/14* | (2006.01) |
| *B23K 103/04* | (2006.01) |

(52) U.S. Cl.
CPC .............. *E21B 43/082* (2013.01); *B22F 3/11* (2013.01); *E21B 43/08* (2013.01); *B23K 2203/05* (2015.10); *B23K 2203/08* (2013.01); *B23K 2203/10* (2013.01); *B23K 2203/14* (2013.01)

(58) Field of Classification Search
CPC .......... E21B 43/08; E21B 43/082; B22F 3/11; B22F 3/1103; B23K 15/0086; B23K 26/342
See application file for complete search history.

(56) References Cited

U.S. PATENT DOCUMENTS

| | | | | |
|---|---|---|---|---|
| 5,293,935 | A * | 3/1994 | Arterbury | B01D 29/111 166/228 |
| 5,664,628 | A * | 9/1997 | Koehler | B01D 29/111 166/228 |
| 6,092,604 | A * | 7/2000 | Rice | B01D 29/15 166/228 |
| 8,414,281 | B2 * | 4/2013 | Schleiss | B22F 3/1055 425/174.4 |

(Continued)

OTHER PUBLICATIONS

D D Gu; W Meiners; K Wissenbach; R Poprawe,"Laser additive manufacturing of metallic components: materials, processes and mechanisms", International Materials reviews,vol. 57 Issue 3 (May 2012), pp. 133-164.

(Continued)

*Primary Examiner* — Ryan Reis
(74) *Attorney, Agent, or Firm* — Cantor Colburn LLP

(57) ABSTRACT

An embodiment of a method of manufacturing a downhole fluid control apparatus includes generating, using a processor, a design for a metallic porous structure configured to be deployed with a fluid control device, the fluid control device configured to be disposed in a borehole in an earth formation and inhibit the flow of particulates between a flow conduit and at least one of the borehole and the formation. The method also includes applying an energy beam from an energy source to a granular metallic material, and additively forming the metallic porous structure based on the design as a single structure having a distribution of pores therein.

20 Claims, 4 Drawing Sheets

(56) References Cited

U.S. PATENT DOCUMENTS

| | | | | |
|---|---|---|---|---|
| 2008/0028891 A1* | 2/2008 | Calnan | ................... | B22F 3/008 76/108.4 |
| 2011/0265990 A1* | 11/2011 | Augustine | ............... | E21B 43/08 166/230 |
| 2013/0004664 A1* | 1/2013 | Agrawal | ................ | E21B 41/00 427/192 |
| 2013/0310961 A1* | 11/2013 | Intriago Velez | .... | B29C 67/0051 700/97 |
| 2013/0320598 A1* | 12/2013 | Atkins | ................. | B22F 3/1055 264/497 |
| 2016/0258256 A1* | 9/2016 | Nguyen | ................ | E21B 43/088 |

OTHER PUBLICATIONS

P. A. Kobryn, S. L. Semiatin "The laser additive manufacture of Ti-6Al-4V", JOM Sep. 2001, vol. 53, Issue 9, pp. 40-42.

\* cited by examiner

POROUS STRUCTURE FOR DOWNHOLE FLUID CONTROL APPLICATIONS AND METHOD OF MANUFACTURE

BACKGROUND

Various tools are utilized in the hydrocarbon exploration, drilling and completion industry to increase or maximize production efficiency. Some such tools include various types of flow control devices and features. For example, flow control and/or filtering devices such as gravel packs and sand screens are employed during production operations to filter particulates from formation fluids (e.g., oil and gas). Other devices such as frac packs and frac screens can be employed during hydraulic fracturing operations to prevent particulates from entering a borehole.

The use of gravel in sand control presents challenges in controlling the size and shape of pores. Bonded bead packs or other types of pre-made porous components have been employed for use in sand control. These types of components are traditionally formed by brazing or sintering beads, and also present challenges in obtaining desired pore size and shape, as well as pore consistency and high pressure ratings.

BRIEF DESCRIPTION OF THE INVENTION

An embodiment of a method of manufacturing a downhole fluid control apparatus includes generating, using a processor, a design for a metallic porous structure configured to be deployed with a fluid control device, the fluid control device configured to be disposed in a borehole in an earth formation and inhibit the flow of particulates between a flow conduit and at least one of the borehole and the formation. The method also includes applying an energy beam from an energy source to a granular metallic material, and additively forming the metallic porous structure based on the design as a single structure having a distribution of pores therein.

An embodiment of an apparatus for manufacturing a downhole fluid control device includes an energy source configured to emit an energy beam, and a source of granular metallic material. The apparatus also includes a processor configured to at least one of acquire and generate a design for a metallic porous structure configured to be deployed with the fluid control device, the fluid control device configured to be disposed in a borehole in an earth formation and inhibit the flow of particulates between a flow conduit and at least one of the borehole and the formation, the processor configured to direct the energy beam to additively form the metallic porous structure based on the design.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

There are provided systems, apparatuses and methods for controlling sand and other particulates in a downhole environment. An embodiment of a flow control device, configured to be disposed in a borehole, includes a porous structure made from a metallic material, such as steel or a corrosion resistant alloy. The porous structure is manufactured using an additive manufacturing process in which successive layers of the metallic material are deposited to form the structure. An exemplary manufacturing method includes applying a laser beam or other energy source such as electron-beam to a granular metallic material such as a metallic powder. The laser may selective heat and/or melt the powder in successive layers. The porous structure can be designed to have a uniform pore size, shape and/or distribution, and can also be designed to optimize filtering and flow properties by selecting pore size, shape and/or distribution based on expected particle properties. The expected particle properties can be estimated using existing knowledge of the formation, core samples, in situ measurements, or any other available source of information.

Figure 1:
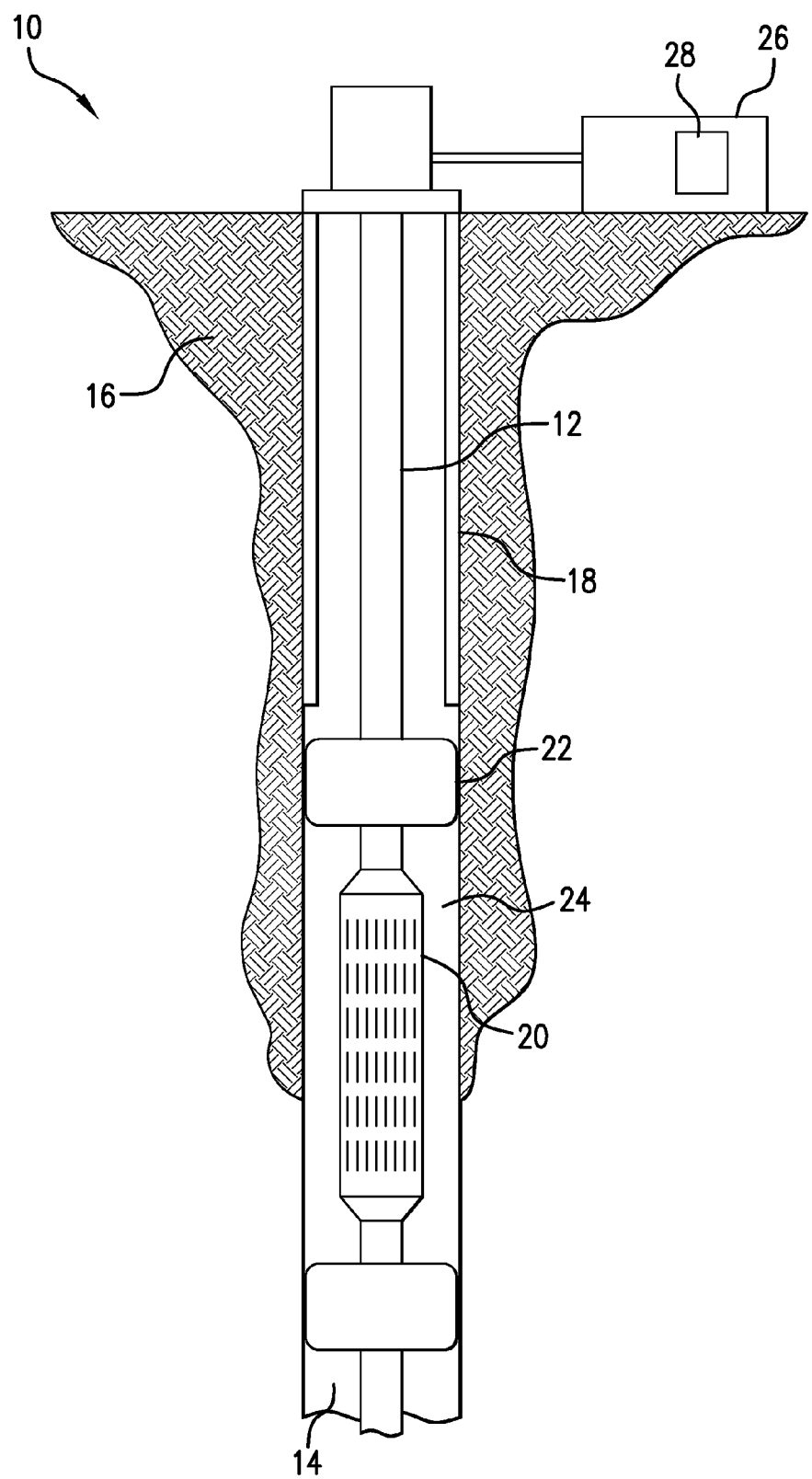
FIG. 1 depicts an embodiment of a downhole completion and/or production system including a flow control device such as a sand screen assembly.

Referring to FIG. 1, an exemplary embodiment of a downhole completion and/or production system 10 includes a borehole string 12 that is shown disposed in a borehole 14 that penetrates at least one earth formation 16. In this embodiment, the borehole string 12 is a production string. The borehole 14 may be an open hole or an at least partially cased hole having a casing 18, and may be generally vertical or include a deviated and/or horizontal component. A "borehole string", as used herein, refers to any structure or carrier suitable for lowering a tool through a borehole and/or connecting a tool to the surface, and is not limited to the structure and configuration described herein. A "carrier" as described herein means any device, device component, combination of devices, media and/or member that may be used to convey, house, support or otherwise facilitate the use of another device, device component, combination of devices, media and/or member. Exemplary non-limiting carriers include borehole strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

The system includes a flow control tool or device 20 such as a sand screen assembly. The flow control device 20 is configured to allow fluids from the formation to enter the production string, and also serves to filter or remove solids and particulates (e.g., sand) and/or other undesirable materials from the fluids prior to entering the production string. As used herein, the term "fluid" or "fluids" includes liquids, gases, hydrocarbons, multi-phase fluids, mixtures of two of more fluids, water, brine, engineered fluids such as drilling mud, fluids injected from the surface such as water, and naturally occurring fluids such as oil and gas.

The system 10 may also include one or more packers 22 for establishing a production zone 24 that is isolated from the rest of the borehole. Any number of production zones 24 can be established, each having one or more flow control devices 20 therein. Although the production zone 24 is shown in an open hole portion of the borehole, it is not so limited. For example, the production zone can be cased by a solid or perforated casing.

The flow control device 20 may include or be deployed with various other components. For example, the production string can include at least one fluid conduit such as a gravel slurry conduit for introducing gravel into an annulus. Gravel, as referred to herein, includes any type of filtering material that can be injected into a borehole region and includes rock, mineral or other particles sized to prevent sand or other particulate matter in production fluid from passing therethrough.

In one embodiment, the flow control device 20 and/or other downhole components are equipped for operable and/or fluid communication with a surface unit 26. The surface unit 26 may be used to control various aspects of production, such as controlling pumps, monitoring production, controlling injection of fluids (e.g., gravel slurry, production fluids, fracturing fluids, etc.) and controlling operation of downhole tools. The surface unit 26 may include one or more processing units 28, and the flow control device 20 and/or other components of the production string 12 may include transmission equipment to communicate with the surface unit 26.

Figure 2:
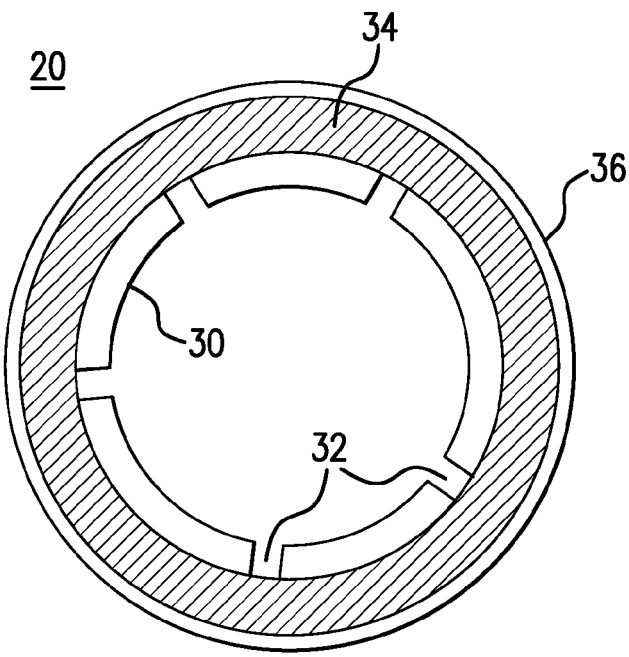
FIG. 2 is a cross-sectional view of a portion of an embodiment of the flow control device of FIG. 1.

FIG. 2 is a cross-sectional view of an embodiment of the flow control device 20. The flow control device 20 includes a base pipe or tubular 30 and a plurality of radially and axially placed fluid passages or perforations 32 extending through the base pipe wall. A porous structure 34 surrounds the base pipe 30 or is otherwise positioned between the annulus and the perforations 32 to filter formation fluid flowing from the formation into a flow conduit formed in the production string 12. The porous structure 34, in one embodiment, is formed from a metallic material by an additive process. Exemplary metallic materials include various types of steel or stainless steel, and metal alloys such as aluminum and titanium alloys.

Additive processes utilize energy such as electromagnetic radiation from a laser or other energy source to create an object or structure by laying down successive layers of a material to build the structure. In one embodiment, the porous structure is formed from a granular metallic material (e.g., powder) by a process that includes selectively heating and/or melting the material to form each successive layer. Examples of this process include selective laser melting, electron-beam melting, and direct metal laser sintering.

Figure 3:
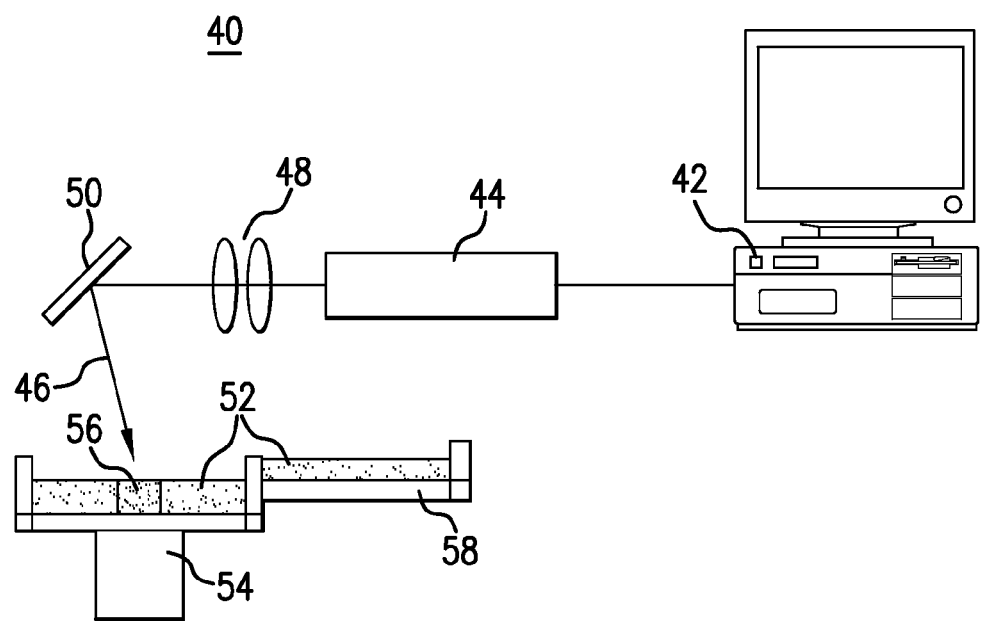
FIG. 3 depicts an embodiment of a manufacturing system or apparatus for manufacturing a metallic porous structure.

An exemplary system for performing an additive process to manufacture the porous structure is shown in FIG. 3. A manufacturing system 40 for performing a manufacturing process includes a processing device 42 (e.g., a desktop or laptop computer) connected to a laser 44. The processing device includes suitable software to control the laser 44 based on an inputted design. The design may be created by a user using software, such as a computer aided design (CAD) program, stored in the processing device 42, or the design may be input from a different device.

The processing device 42 directs the laser to emit a beam 46, and steers or otherwise controls the beam using, e.g., lenses 48 and a scanning mirror 50. The beam 46 is applied to a stainless steel or metal alloy powder 52 disposed on a building platform 54 to successively form layers that build a porous structure 56. A powder supply device 58 may be utilized to supply the powder to the building platform.

Some embodiments utilize powdered metallic materials, as distinguished from larger beads typically used to form some filtering structures. The powdered material may be significantly smaller than such beads and smaller than the intended pores for the structure, allowing the process the create a porous structure having precisely defined pores, i.e., having precisely defined sizes, shapes and/or distributions. In one embodiment, the porous structures defined herein have pore sizes, shapes and distribution that are at least substantially uniform throughout the structure. In addition, the pores may be designed based on knowledge of the formation to customize the structure to filter particulates having certain sizes and shapes, and/or from known formation types (e.g., sandstone, shale, etc.).

One embodiment of a method of manufacturing a porous structure includes acquiring, generating and/or creating a design for the porous structure. An example of a design includes a uniform array (uniform size and distribution) of pores having a spherical shape or any other suitable shape (e.g., cylindrical, polygonal, etc.). The design may be defined by the size and shape of the pores or the material surrounding the pores, and/or by pore or material density. For example, a design may be generated that features pores having a selected diameter (e.g., about 200 microns), and that has a selected percentage or proportion of material vs. pore space, such as 70% real density (i.e., 70% of the structure volume is solid material and 30% is pore space).

A processing device controls a system (e.g., the system of FIG. 3) to additively form the design from a metallic material by using an energy beam to heat a metallic powder and form successive layers. Each layer is formed on the immediately preceding layer until the structure is complete. In one embodiment, the layers are formed using a "powder bed" method, in which a layer or "bed" of powder is laid on a surface (e.g., the building platform 54), and a laser beam (or other suitable energy beam) is applied to portions of the bed of powder to fuse the powder together into the desired shape of the layer. In another embodiment, the method includes supplying the metallic powder to a surface as the laser or other beam source is applied and moved over the surface/structure. An example of such a method is referred to as laser engineered net shaping (LENS), which includes supplying metal powder coaxially with a laser beam, melting the powder, and moving the beam (and/or surface or table) two-dimensionally along with the powder supply as each layer is formed.

Figure 4:
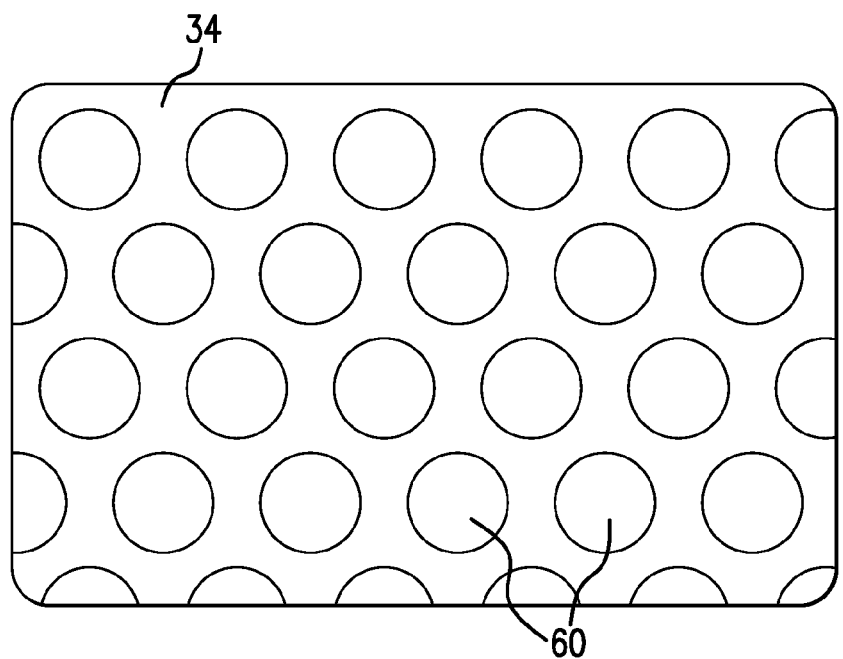
FIG. 4 depicts an example of a distribution of pores in a metallic porous structure for use as or in a flow control device.

Using the above processes, an ideal pore structure (having controlled pores sizes, shapes and distribution) can be formed. Factors that may be considered in designing the porous structure include flow performance (e.g., designing pore sizes based on expected fluid composition or properties such as viscosity), and mechanical strength (which can be controlled by selection of material as well as pore size and distribution). Other factors that can be controlled include the chemistry, size, and shape of the powder, laser parameters, and post-treatment. An exemplary pore structure is shown in FIG. 4, which illustrates an example of pores 60 having a uniform size, shape and distribution that can be achieved if desired.

Figure 5:
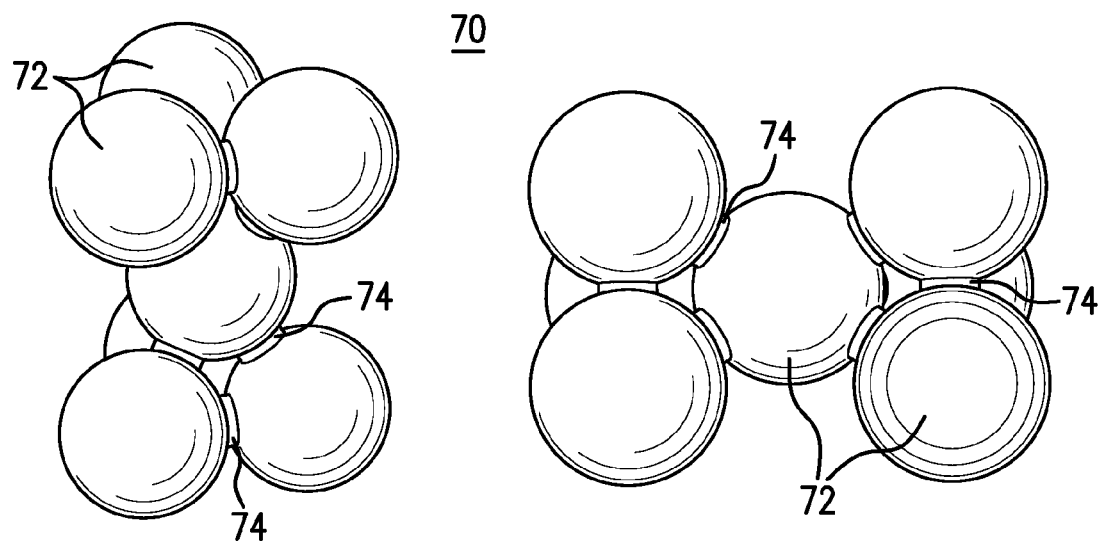
FIG. 5 depicts perspective views of a portion of an exemplary metallic porous structure.
Figure 6:
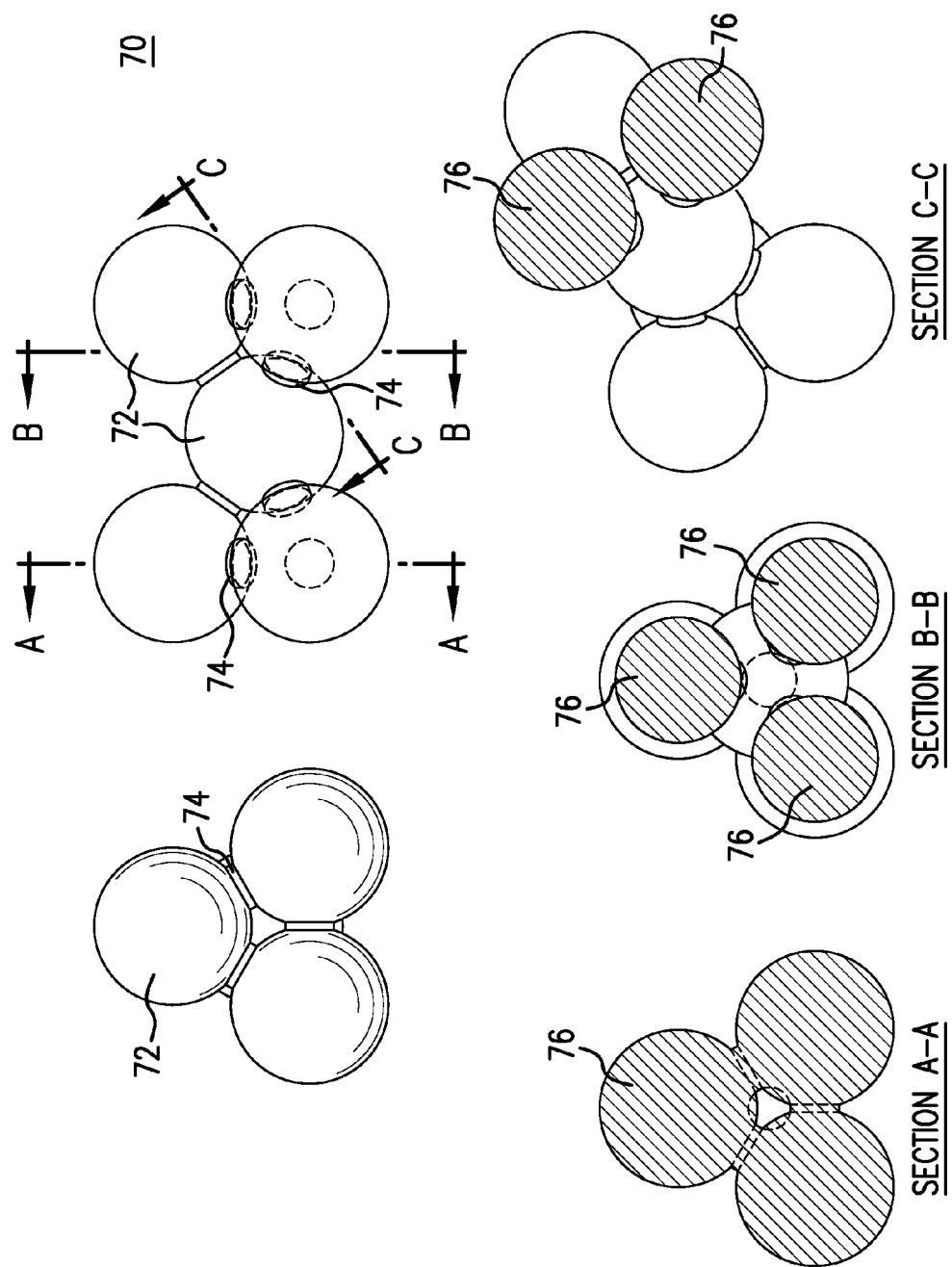
FIG. 6 depicts perspective and cross-sectional views of the porous structure of FIG. 5.

Another exemplary pore structure is shown in FIGS. 5 and 6, which depicts three-dimensional views and cross-sectional views of a portion 70 of the pore structure.

The portion includes multiple spherical structures 72 formed of solid metal and held in fixed relationship with one another by cylindrical connecting structures 74. The pattern formed by the portion 70 may be repeated in one or more directions to form an overall structure having any selected thickness, size or shape. FIG. 6 shows various cross-sections of the portion 70 along different planes, denoted by lines A-A, B-B and C-C. Depending on the orientation of the portion or structure relative to the surface on which the structure is formed, the cross-hatched region 76 of either cross-section A-A, B-B or C-C could form one of the successive layers of the structure that are laid down by an additive process as described herein.

The method provides great flexibility and precision of the design. Every aspect of the design can be precisely specified. For example, as shown in FIG. 6, dimensions such as the diameter of the spherical structures, the diameter of the connecting structures, separations between the spherical structures and any other aspect can be precisely defined and manufactured. FIG. 6 shows exemplary dimensional values in millimeters, which are provided for illustration purposes only and are not intended to be limiting in any way.

The system 10 and/or porous structure 34 may be used in methods of controlling particulates such as produced sand in a borehole. The method is performed in conjunction with the flow control device, which can be configured for different types of applications. For example, the porous structure is included in a sand screen, pre-perforated liner, frac screen or any other type of screening device, by disposing the porous structure on a surface and/or in perforations in the screening device. Although the methods are described in conjunction with the tool 20, the method can be utilized in conjunction with any flow control device or system that can include the porous structure.

In a first stage, a flow control device such as a sand screen is deployed to a downhole location, via for example a borehole string or wireline. In a second optional stage, if a gravel pack is desired, a gravel slurry is pumped or otherwise advanced through the borehole string and exits into an annular region of the borehole. In a third stage, fluid is advanced to or from the formation and/or borehole, and the flow control device and the porous structure inhibit or prevent particulates from passing through the flow control device. For example, in a production operation, the flow control device filters or inhibits particulates such as sand from formation fluid as the formation fluid passes from the formation to a production conduit.

The systems and methods described herein provide various advantages over prior art techniques. For example, the porous structures described herein can be precisely designed to have specific pore sizes and shapes that can be uniquely tailored to the types of particulates that are expected to be encountered during a downhole operation. In addition, the pore structure can be produced with a uniformity that is not feasible using other techniques. For example, bonded bead packs used for sand control and other fluid control applications are made by traditional brazing or sintering processes. However, such processes have disadvantages including difficulty in obtaining consistent pore size and percentage of pores, weak strength, oxidation and sensitization of the beads. The apparatuses, devices and methods described herein address such disadvantages.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of manufacturing a downhole fluid control apparatus, the method comprising:
generating, using a processor, a design for a metallic porous structure configured to be deployed with a fluid control device, the fluid control device configured to be disposed in a borehole in an earth formation and inhibit the flow of particulates between a flow conduit and at least one of the borehole and the formation, the design specifying an array of solid structures making up the metallic porous structure and a plurality of connecting structures configured to connect a plurality of solid structures in the array and separate the plurality of solid structures from each other by a selected distance;
applying an energy beam from an energy source to a granular metallic material, and additively forming the metallic porous structure based on the design as a single structure having a distribution of pores therein, a size of the pores configured based on the selected distance separating the plurality of solid structures.

2. The method of claim 1, further comprising a processing device configured to control the energy source to additively form the metallic porous structure.

3. The method of claim 1, wherein the granular metallic material is selected from one of stainless steel and a corrosion resistant metal alloy.

4. The method of claim 1, wherein generating the design includes selecting at least one of a size, shape and distribution of the pores to inhibit particulate material produced from the formation.

5. The method of claim 1, wherein the plurality of connecting structures are cylindrical structures connecting the plurality of solid structures to each other.

6. The method of claim 4, wherein generating the design includes estimating a lithology of the formation, and selecting the size, shape and distribution based on the lithology.

7. The method of claim 4, further comprising selecting at least one of the size and shape of grains in the granular metallic material based on expected properties of the particulate material.

8. The method of claim 1, wherein the energy beam is an electromagnetic beam and the energy source includes a laser.

9. The method of claim 8, wherein the electromagnetic beam is applied as part of a selective laser melting process.

10. The method of claim 1, wherein the pores have a uniform size and shape throughout the porous structure.

11. An apparatus for manufacturing a downhole fluid control device comprising:
an energy source configured to emit an energy beam;
a source of granular metallic material; and
a processor configured to at least one of acquire and generate a design for a metallic porous structure configured to be deployed with the fluid control device, the fluid control device configured to be disposed in a borehole in an earth formation and inhibit the flow of particulates between a flow conduit and at least one of the borehole and the formation, the design specifying an array of solid structures making up the metallic porous structure and a plurality of connecting structures configured to connect a plurality of solid structures in the array and separate the plurality of solid structures from each other by a selected distance, the processor configured to direct the energy beam to the granular metallic material and additively form the metallic porous structure based on the design as a single structure having a distribution of pores therein, a size of the pores configured based on the selected distance separating the plurality of solid structures.

12. The apparatus of claim 11, wherein the pores have a uniform size and shape throughout the porous structure.

13. The apparatus of claim 11, wherein the porous structure is formed from a material selected from one of stainless steel and a corrosion resistant metal alloy.

14. The apparatus of claim 11, wherein the energy beam is an electromagnetic beam.

15. The apparatus of claim 14, wherein the processor is configured to direct the electromagnetic beam to selectively melt the granular material and form successive layers of the porous structure.

16. The apparatus of claim 15, wherein the source is configured to supply a bed of the granular material to a surface prior to the electromagnetic beam melting each successive layer.

17. The apparatus of claim 15, wherein the source is configured to supply the granular material coaxially with the electromagnetic beam.

18. The apparatus of claim 11, wherein the flow conduit is incorporated with a production string, and the flow control device is configured to filter formation fluids as the formation fluids are extracted from the formation to a surface location.

19. The apparatus of claim 11, wherein the pores have at least one of a size, shape and distribution selected to inhibit particulate material in the formation, at least one of the size, shape and distribution selected based on an estimation of a lithology of the formation.

20. The apparatus of claim 11, wherein the plurality of solid structures are spherical structures, and the plurality of connecting structures are cylindrical structures connecting the plurality of solid structures to each other.

* * * * *